United States Patent [19]

Bose et al.

[11] Patent Number: 4,994,324

[45] Date of Patent: Feb. 19, 1991

[54] HOT-FILL POLYETHYLENE BAGS

[75] Inventors: Ajit K. Bose, Lawrenceville, N.J.; Kurt F. Strater, Barnesville, Ga.

[73] Assignee: Union Camp Corporation, Wayne, N.J.

[21] Appl. No.: 299,861

[22] Filed: Jan. 19, 1989

[51] Int. Cl.$^5$ .................. B32B 7/12; B32B 15/04; B32B 27/08; C08L 23/00

[52] U.S. Cl. ................... 428/349; 428/516; 428/517; 525/240

[58] Field of Search ............ 428/349, 516, 517; 525/240

[56] References Cited

U.S. PATENT DOCUMENTS

| | | |
|---|---|---|
| 4,188,350 | 2/1980 | Vicik et al. . |
| 4,188,443 | 2/1980 | Mueller et al. . |
| 4,256,784 | 3/1981 | Gebhardt et al. ............. 428/516 X |
| 4,303,708 | 12/1981 | Gebhardt et al. . |
| 4,356,221 | 10/1982 | Anthony et al. ............. 428/516 X |
| 4,415,718 | 11/1983 | Miyoshi et al. ............. 428/215 X |
| 4,419,411 | 12/1983 | Park . |
| 4,501,779 | 2/1985 | Hsu et al. . |
| 4,502,263 | 3/1985 | Crass et al. ............. 428/349 X |
| 4,564,558 | 1/1986 | Touhsaent et al. ............. 428/349 |
| 4,590,125 | 5/1986 | Balloni et al. . |
| 4,595,625 | 6/1986 | Crass et al. . |
| 4,604,324 | 8/1986 | Nahmias et al. . |
| 4,643,945 | 2/1987 | Kiang . |
| 4,652,489 | 3/1987 | Crass et al. ............. 428/337 |
| 4,681,781 | 7/1987 | Murray et al. . |
| 4,692,379 | 9/1987 | Keung et al. . |
| 4,695,503 | 9/1987 | Liu et al. . |
| 4,720,420 | 1/1988 | Crass et al. ............. 428/349 X |
| 4,741,957 | 5/1988 | Park ............. 428/349 |
| 4,769,284 | 9/1988 | Kakugo et al. ............. 428/349 |
| 4,778,697 | 10/1988 | Genske et al. ............. 428/349 X |
| 4,842,930 | 6/1989 | Schinkel et al. ............. 428/349 |
| 4,855,187 | 8/1989 | Osgood, Jr. et al. ............. 428/349 X |

FOREIGN PATENT DOCUMENTS 59-136224 8/1984 Japan .

Primary Examiner—George F. Lesmes
Assistant Examiner—D. R. Zirker
Attorney, Agent, or Firm—Edward J. Sites

[57] ABSTRACT

This invention is directed to polyethylene bags or film. More particularly, this invention is directed to a sealable transparent film structure for hot-fill having one or more layers, at least one layer comprising a blend of (a) from about 20 to 50 parts by weight of a terpolymer of ethylene, propylene, and butene or hexene, or from about 20 to 50 parts by weight of a propylene modified rubber and 3% maleic anhydride, (b) from about 20 to 75 parts by weight of polypropylene, and (c) from about 20 to 75 parts by weight of Hmw-HDPE resin.

12 Claims, 1 Drawing Sheet

HOT-FILL POLYETHYLENE BAGS

FIELD OF THE INVENTION

This invention is directed to polyethylene bags. More particularly, this invention is directed to sealable, hot-fill polyethylene bags or film wherein at least one layer comprises a blend of an ethylene/propylene/butene or hexene terpolymer and polypropylene.

BACKGROUND OF THE INVENTION

It is well known in the art that various polymers are useful in packaging, primarily as heat-shrink wrapping or hot- or cold-fill bags. Typically such packaging comprises polymers or co-polymers of ethylene, propylene, and the like.

None of the polymeric substances used in the prior art have been entirely suitable for hot-fill applications. Said polymers and the resultant packaging have suffered from problems such as weakening and deformation under heat. Accordingly, there has been a need for improved hot-fill packaging that would not deform or weaken under such use.

OBJECTS OF THE INVENTION

It is an object of the invention to provide improved packaging material.

It is also an object of the invention to provide sealable, hot-fill polyethylene bags or film having improved properties.

It is a further object of the invention to provide hot-fill polyethylene bags or film comprising at least one layer formed from a blend of (a) a terpolymer of ethylene, propylene, and hexene or butene and (b) polypropylene.

These and other objects of the invention will become more apparent in the discussion below.

SUMMARY OF THE INVENTION

Sealable, transparent film structures for hot-fill applications have one or more layers. At least one layer comprises a blend of
 (a) from about 20 to 50 parts by weight of a terpolymer of ethylene, propylene, and butene or hexene, or from about 20 to 50 parts by weight of propylene modified rubber,
 (b) from about 20 to 75 parts by weight of polypropylene, and
 (c) from about 20 to 75 parts by weight of high molecular weight, high density polyethylene.

DETAILED DESCRIPTION OF THE INVENTION

Figure 1:
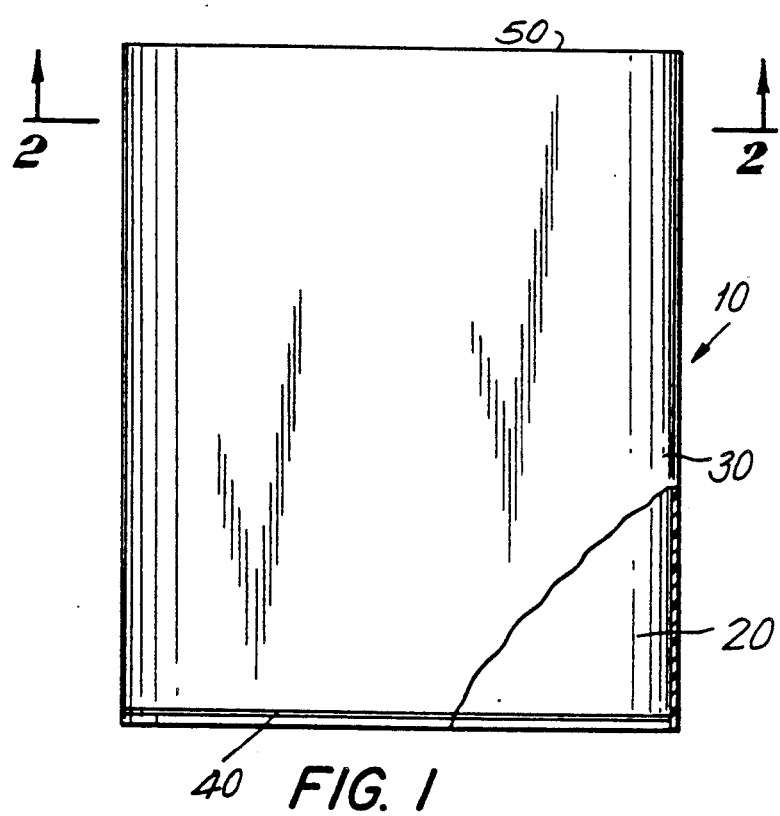
FIG. 1 is a planar view of one embodiment of the invention having a single layer.

Applicants have surprisingly found that certain polyethylene bags overcome the disadvantages of known hot-fill bags. According to their invention, sealable transparent film structures for hot-fill have one or more layers, preferably one or three layers. The single, heat-resistant layer or at least one heat-resistant layer comprises a blend of
 (a) from about 20 to 50 parts by weight of a terpolymer of ethylene, propylene, and butene or hexene, optionally with maleic anhydride, or from about 20 to 50 parts by weight of propylene modified rubber,
 (b) from about 20 to 75 parts by weight of polypropylene, and
 (c) from about 20 to 75 parts by weight of high molecular weight, high density polyethylene (Hmw-HDPE).

The use of the terpolymer or modified rubber/polypropylene/HDPE blend imparts required strength and stiffness to film. The resulting film structures tend to retain their strength and to deform less in hot-fill applications.

Terpolymers useful herein generally comprise from about 15 to 30% by weight of ethylene, from about 5 to 15% by weight of propylene, and from about 55 to 80% by weight of butene-1 or hexene-1. Preferably the terpolymers comprise from about 20 to 25% by weight of ethylene, from about 7 to 13% by weight of propylene, and from about 60 to 72% by weight of butene-1 or hexene-1. In an especially preferred embodiment of the invention, the ethylene and propylene together comprise 30 to 35% by weight of the terpolymer.

These terpolymers can be prepared by copolymerization according to methods well known in the art. See, for example, U.S. Pat. Nos. 4,256,784, 4,415,718, 4,643,948, and 4,652,489, incorporated herein by reference. Also, such terpolymers are available commercially, such as, for example, NORSOFLEX 1600, 3318, or 4700 from Cdf Chemie. NORSOFLEX 3318 and 4700 each contain approximately 3% maleic anhydride. It is within the scope of the invention that the terpolymer may contain from about 2 to 5% of maleic anhydride, based upon the total weight of the terpolymer. The EPDM component could be the type PA 23, PA 30, or PA 50, available from Exxon Chemical Co.

The polypropylene useful according to the invention can comprise any suitable copolymerizable type polypropylene having melt flow and viscosity characteristics suitable for flexible, sealable plastic bags.

In an embodiment of the invention having one layer, that one layer will be comprised of the terpolymer or modified rubber/polypropylene/HDPE blend described above. However, when the polyethylene hot-fill bags or film according to the invention comprise more than one layer, the other layer or layers will each comprise a form of polyethylene such as LDPE, LLDPE, HDPE, or rubber-modified HDPE or another film or barrier material known in the art. One preferred 3-layer film structure according to the invention comprises:
 (a) an inner layer comprising a blend of (1) from about 20 to 50 parts by weight of a terpolymer of ethylene, propylene, and butene-1 or hexene-1 ; (2) from about 20 to 75 parts by weight of polypropylene; and (3) from about 20 to 75 parts by weight of Hmw-HDPE,
 (b) a middle layer comprising rubber-modified high density polyethylene (HDPE), and
 (c) an outer layer comprising LDPE or LLDPE.

Low density polyethylene (LDPE), linear low density polyethylene (LLDPE), and rubber-modified HDPE can be prepared by known procedures or are readily available commercially. Examples of LDPE have, for example, $\mu I$ 1.0 or under, density of 0.918–0.920. The LDPE could also be a type such as vinyl comonomer modified, EVA content of from about 4 to 8%. Also, see U.S. Pat. Nos. 4,0121,382 and 4,356,221.

Examples of LLDPE should be of higher Alpha olefin variety such as hexene or octene type.

Examples of HDPE include Dow polyethylene, available from Dow Chemical Co., Cain Chemical Hmw-HDPE, or American Hoechst Type 9255.

Examples of rubber-modified HDPE include Paxon Paxplus, available from Allied Chemical Co., and Kraton, available from Shell Chemical Co.

The other useful film materials could be used in various three layer film combinations. For example, a heat resistant/oxygen barrier/antiskid film could comprise an MVTR blend of terpolymer and polypropylene/EVOH-OH/Selar PT.

Blending of the terpolymer, polypropylene, and HDPE can be accomplished in conventional manner by either (1) blending pellets of terpolymer and polypropylene in a suitable vessel and then melt mixing prior to extrusion or (2) melt blending respective melts of terpolymer and polypropylene, and HDPE. The terpolymer/polypropylene/HDPE blend can be extruded through a single, annular die, where the single layer formed will be expanded in a ratio of from about 2:1 to 6:1 by hot air and then cooled. In similar fashion layers of terpolymer/polypropylene/HDPE blend, rubber-modified HDPE, and LDPE or LLDPE could be coextruded in concentric annular dies to form a three-layer tube that will be expanded and then cooled. Heat-sealed packaging is formed in a subsequent step.

The polymeric materials discussed above can also be used to form film. Extrusion or coextrusion would be through slot dies, and the resulting film could be stretched axially and/or biaxially as desired.

Extruded film would be cut and sealed in known manner. Also, each layer would have a total thickness of from about 0.5 to 5 mils, the total thickness of each film being on the order of from about 3 to 10 mils.

Figure 2:
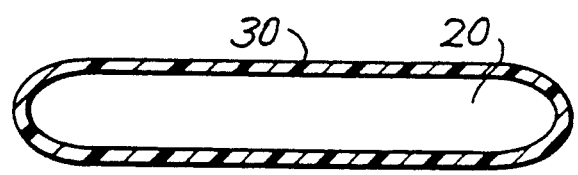
FIG. 2 is a cross-sectional view of the embodiment shown in FIG. 1.

The invention can perhaps be better understood by making reference to the drawings. In FIGS. 1 and 2, a hot-fill bag 10 comprises a single layer 30 that encompasses fill space 20. The bag 10 is heat-sealed or adhesively sealed at bottom seal line 40. The bag 10 can be filled by introducing fill (not shown) through opening 50.

Figure 3:
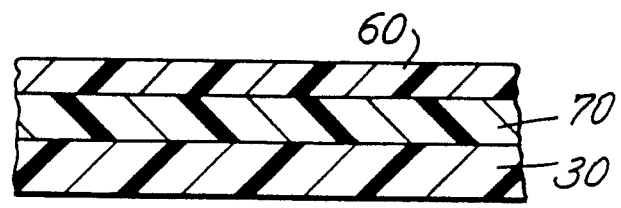
FIG. 3 is a partial, cross-sectional view of a multi-layer film according to the invention.

FIG. 3 represents one embodiment of the invention wherein the film comprises three layers, inner layer 30, middle layer 70, and outer layer 60. Preferably inner layer 30 comprises a blend of terpolymer and polypropylene, middle layer 70 comprises rubber-modified HDPE, and outer layer 60 comprises LDPE or LLDPE.

The following examples describe the manner and the process of making and using the invention and set forth the best mode contemplated by the inventors for carrying out the invention.

EXAMPLES

Example 1

A quantity of 20 gm of pellets of NORSOFLEX 3318 (an ethylene/propylene/butene terpolymer with 10% comonomer content) was dry blended with 40 gm of pellets of Exxon 7153C (polypropylene) and 40 gm of pellets of Hoechst 9255Hs (Hmw-HDPE) in a container. The blend was then heated at 220° C. in a Brabender single screw plasticorder to form a 1:2:2 mixture of terpolymer, polypropylene, and HDPE.

The hot mixture described above was extruded through a slot die having a width of 4 in. with a diegap of 0.007×2.625 inches to form a sheet film. The resulting film had a thickness of 2.8 mils and was transparent.

The film produced was tested for film properties regarding strength, and then an ASTM 1537 oven test for creep was also performed to find the deflection temperature to give a 4 mm deflection as maximum allowable deflection. The results are set forth in the table below.

Examples 2 to 10

By procedures corresponding to that described above, additional blends were prepared and tested. The blend components and the results are set forth in the following table:

TABLE

Blends for Hot-Fill Application

| | Example No. | | | | |
|---|---|---|---|---|---|
| | 1 | 2 | 3 | 4 | 5 |
| Blend: | 40% HDPE[1] 40% pp[2] 20% 3318[3] | 40% HDPE 40% pp 20% PA 23[4] | 40% HDPE 40% pp 20% PA 30[4] | 40% HDPE 40% pp 20% PAX 50[4] | 40% HDPE 40% pp 20% 4700[3] (Old Lot) |
| Gauge (mil) | 2.79 | 3.3 | 2.8 | 2.61 | 2.7 |
| Tensile at Yield (psi) | 1340 | 1299 | 2095 | 1649 | 1648 |
| Tensile at Break (psi) | 941 | 1312 | 2452 | 1559 | 1676 |
| Elongation (+/−%) | 42 | 290 | 312 | 176 | 91 |
| Secant Modulus (psi) | 55529 | 34809 | 63111 | 57753 | 44281 |
| Softening Point (°F.) | 270–275 | 295 | 280 | 280 | 257 |
| Tear (gm/ml) | | | | | |
| MD | 26 | 36 | 10 | 35 | — |
| TD | 45 | 49[10] | 61[10] | 63 | — |

| | Example No. | | | | |
|---|---|---|---|---|---|
| | 6 | 7 | 8 | 9 | 10 |
| Blend: | 40% HDPE 40% pp 20% 4700 (New Lot)[6] | 40% HDPE 40% pp 20% 4700 (New Lot)[7] | 40% HDPE 40% pp 20% VLDPE[5,8] | 40% HDPE 40% pp 20% VLDPE[9] | 50% HDPE 25% pp 25% VLDPE |
| Gauge (mil) | 3.38 | 3.54 | 3.22 | 3.09 | 2.2 |
| Tensile at Yield (psi) | 1409 | 1005 | 1639 | 1623 | 2776 |
| Tensile at Break (psi) | 1311 | 995 | 1710 | 1676 | 4907 |
| Elongation (+/−%) | 72 | 26 | 148 | 154 | 342 |

TABLE -continued

Blends for Hot-Fill Application

| | | | | | |
|---|---|---|---|---|---|
| Secant Modulus (psi) | 43062 | 28742 | 42552 | 52532 | 69120 |
| Softening Point (°F.) | 270 | 275 | 270–275 | 270–275 | 257 |
| Tear (gm/ml) | | | | | |
| MD | 8 | 8 | 22 | 18 | 12 |
| TD | ++ | ++ | ++ | ++ | ++ |

[1] Hoechst 9255 HS
[2] Exxon 7153C
[3] NORSOFLEX 3318 or 4700, terpolymer-ethylene acrylic ester-maleic anhydride
[4] Exxon PA 23, PA 30, or PAX 50 EPDM
[5] NORSOFLEX 1600
[6] Temperature Profile, EXT: 220, 220, 220; DIE: 230
[7] Temperature Profile, EXT: 230, 230, 230; DIE: 240
[8] Temperature Profile, EXT: 230, 230, 230; DIE: 240
[9] Temperature Profile, EXT: 210, 210, 210; DIE: 220
[10] Did not get straight tear; therefore, constant radius method was used With regard to the results shown in the above table, it should be noted that the web was too narrow to perform a TD tear on the films of Examples 8 to 10. Also, the MD tear strength of the films from Examples 5 to 7 was so low that the TD samples tore in the MD direction even when the constant radius method was employed.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A sealable transparent film structure for hot-fill having one or more layers, at least one layer comprising a blend of
   (a) from about 20 to 50 parts by weight of a terpolymer of ethylene, propylene, and butene-1 or hexene-1, or from about 20 to 50 parts by weight of propylene modified rubber;
   (b) from about 25 to 75 parts by weight of polypropylene; and
   (c) from about 25 to 75 parts by weight of Hmw-HDPE.

2. The structure of claim 1, wherein the film has only one layer.

3. The structure of claim 1, wherein the film has three layers.

4. The structure of claim 1, wherein the film has inner, middle, and outer layers and the inner layer comprises said blend.

5. The structure of claim 4, wherein the middle layer is rubber-modified HDPE.

6. The structure of claim 4, wherein the outer layer is LDPE or LLDPE.

7. The structure of claim 1, wherein component (a) of the blend comprises a terpolymer of ethylene, propylene, and butene-1.

8. The structure of claim 1, wherein component (a) of the blend comprises a terpolymer of ethylene, propylene, and hexene-1.

9. The structure of claim 1, wherein the terpolymer of component (a) comprises maleic anhydride.

10. The structure of claim 9, wherein the maleic anhydride is present in an amount of from about 2 to 5% by weight based upon the total weight of the terpolymer.

11. The structure of claim 1 which is a bag.

12. The structure of claim 1 which is a film.

* * * * *